March 20, 1934.    L. I. LEGG    1,951,761
MECHANICAL TIRE CHAIN APPLIER
Filed April 24, 1933    2 Sheets-Sheet 1
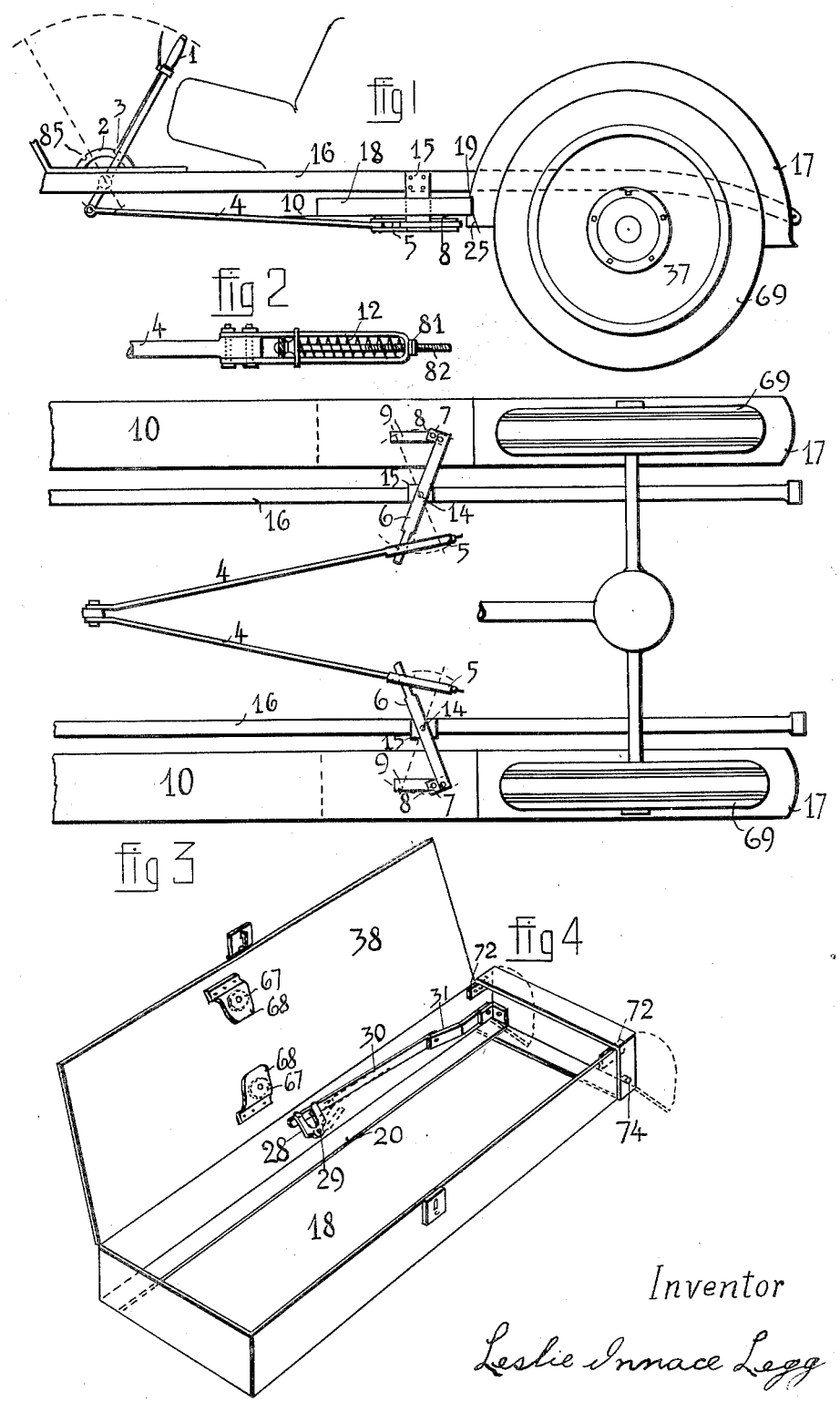
Inventor
Leslie Innace Legg March 20, 1934.   L. I. LEGG   1,951,761
MECHANICAL TIRE CHAIN APPLIER
Filed April 24, 1933   2 Sheets-Sheet 2
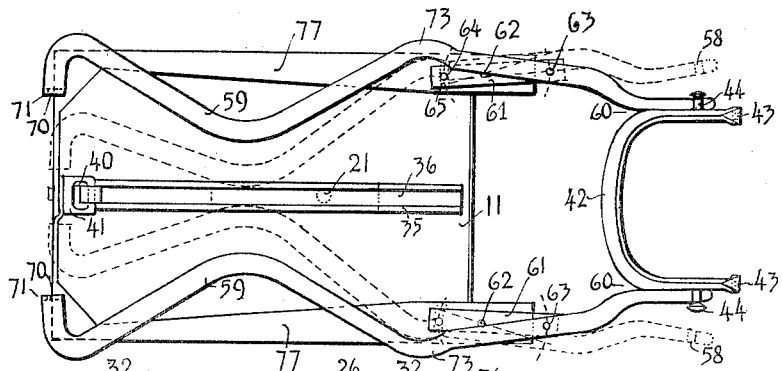
Inventor
Leslie Innace Legg Patented Mar. 20, 1934

1,951,761

UNITED STATES PATENT OFFICE 1,951,761

MECHANICAL TIRE CHAIN APPLIER

Leslie Innace Legg, Fenn, Alberta, Canada

Application April 24, 1933, Serial No. 669,670
In Canada May 17, 1932

8 Claims. (Cl. 152—14)

My invention relates to new and useful improvements consisting in a mechanical device for attaching, tightening and locking tire chains to pneumatic wheels of mechanically propelled vehicles, the object of my invention being to enable the driver of such vehicle to securely attach such tire chains to the wheels without leaving his seat within the vehicle.

My invention is adaptable to a variety of mechanically propelled vehicles. It provides a suitable place to store and carry such chains ready for application to the tire by actuating a lever conveniently placed to the driver's seat. In passenger automobiles the running board offers a convenient and readily accessible means for housing the device. Such device may be arranged on top or incorporated in the running board. If arranged on top, the running board serves as bottom for the outer box. If the container is built into the running board, it has to be provided with a proper bottom. In that case a section of the running board serves as lid to the device. A portion of the mudguard has to be cut away to allow for the insertion of the box. Similar arrangements are required for each wheel to which tire chains are intended to be applied but they all can be activated by one single lever by the driver's seat.

I attain these objects by means of the mechanism illustrated in the accompanying drawings. These are worked out for application of the device on top of an automobile running board and as applied to the front of a rear driving wheel.

Figure 1 shows attached to the running board of an automobile of conventional design a metal outer box in which is contained a movable inner box holding the tire chain,—the device for projecting and attaching the tire chain to the driving wheel of the vehicle and it also illustrates the lever, rods and lever arms controlling the mechanism in the box.

Figure 2 shows the universal joint between the actuating rod and the lever in detail.

Figure 3 is a plan view of the rear portion of an automobile seen from below and shows the operation of the rods and lever arms.

Figure 4 shows the outer box with lid open and illustrates the device for opening the rear door to allow projection of the inner box with chain. It also shows the rollers attached to the lid of the outer box by means of which the tire clamp spreaders are operated. This figure further shows the blocks forcing the final position of the clamp spreaders and the stud for limiting the traverse of the inner box.

Figure 5 is a plan view of the clamp spreaders attached to the inner box and illustrates their operation. The clamp is shown held in position and the toggle arms inserted between the clamp spreaders and the box.

Figure 6 illustrates the storage space for the tire chain, the springs providing the necessary tension when the chain is being released, the adjusting arms with one of the chain locks inserted in its holder. It gives a top view of the notched brace pivoted to the adjusting arm, the slot through which the stud on the toggle arm projects into the inner box and the spring acting on the stud. It shows the 4 studs for distancing the inner box from the outer box and the stud operating the door opening device.

Figure 7 is an inner side view of one of the adjusting arms, partly in section, with the automatic chain lock inserted in the socket of the adjusting arm.

Figure 8 is a side view of the inner box showing the adjusting arm and its operation, the brace pivoted to the adjusting arm and the spring between the brace and the box. The clamp spreaders are shown in side view.

Figure 9 is a longitudinal section through the inner box showing the storage space for the tire chain, the tension springs, the clamp spreaders and the adjusting arms. It shows the stud on the toggle arm in contact with the spring.

Figure 10 is a cross section through the inner box looking towards the rear end thereof and showing the storage space for the tire chain, the tension springs and the spreader arms.

Figure 11 is a view of the spring steel tire clamp.

Figure 12 is a cross section through the tire clamp, showing part of the chain attached.

Figure 13 is a side view of the automatic chain lock showing the lock open,—the direction of the movement of the locking arm and, in broken lines the position of the locking arm when the lock is closed. It also shows the spring on the locking arm holding the safety stud.

Figure 14 shows the chain on the wheel with the clamp in position just prior to locking.

Figure 15 shows the automatic lock released from the socket in the adjusting arm, locked to the clamp stud,—the chain now being securely attached to the wheel and the operation completed.

Throughout the illustrations like characters designate like parts in the several views.

Referring to the drawings in detail:—

1 represents a lever conveniently placed to the driver's seat in its operating position,—locked to quadrant 2 at 3. The action is transmitted by adjustable connecting rods 4 4 universal joints 5 5, shown in detail in Figure 2, lever arms 6 6 and the articulated members 7 7 carrying studs 8 8 which project through slots 9 9 in the running boards 10 10 into holes 21 21 in the bottoms of inner boxes 11 11, providing means for sliding the inner boxes 11 11 longitudinally within the outer boxes 18 18. Lever arms 6 6 are pivoted to brackets 15 15 by pins 14 14 and brackets 15 15 are attached to frame 16 of the vehicle. On the running boards 10 10 and adjacent to rear mudguards 17 17 are fixed the outer boxes 18 18, a portion of the mudguards 17 17 being cut out at 19 19 for their reception.

In so far as the details of this invention are concerned, the arrangements on both sides of the automobile are duplicates of each other. In order to avoid misleading repetition, the description from this point onward will deal with one side only as constituting an inherently complete unit.

Universal joint 5 is provided with a strong spring 12. This spiral spring 12 fills a series of functions. It allows the action of the joint to be universal,—it takes up any irregular or reverse movement of inner box 11,—it assists in the positive closing of chain locks 45 45 and it supplies the necessary tension to chain 13 just prior to locking same to wheel 37.

Inner box 11 serves as container for tire chain 13;—it has two studs 32 32 projecting outward on each side to secure space between inner box 11 and outer box 18 for parts 23, 74, 28, 31 and 32 to operate. The sides of box 11 are made of angle irons 77 77, the angle projecting inwards. The ends of angle irons 77 77, extending somewhat beyond the bottom of inner box 11, provide space for attaching spreader arms 59 59 and pivots 76 76 for adjusting arms 24 24. The bottom of box 11 at its rear end is turned up part of the height of the box,—thus forming the rear end of inner box 11 and is cut away at the sides to permit the pivoting of adjusting arms 24 24. The rear end of box 11 is left partly open to allow for the passage of the ends of chain 13 to clamp 42 and automatic locks 45 45 in their respective holders.

Automatic lock 45, as shown in Figure 13, consists of a shaped catch 46 and locking arm 47. These two parts are pivotally connected at 51. A flat spring 48 is fastened to locking arm 47 and stud 49, protruding through a hole in locking arm 47 and attached to said spring 48. This stud 49 is lifted by catch 46, being bevelled at 50, passing through locking arm 47 and, influenced by spring 48, stud 49 drops back and prevents any reverse action of catch 46.

Automatic locks 45 45 as described, having chain 13 attached to locking arms 47 47, are placed in sockets 53 53 of adjusting arms 24 24;—cross chain 82 is placed under the spring 33 attached to the bottom of box 11,—cross chain 83 is placed under spring 34 whilst the balance of the cross chains are placed under the detachable forked spring 35 in rotation,—cross chain 84 being placed first. Added pressure is given springs 33, 34 and 35 when lid 38 of outer box 18 comes in contact with the upper bend in spring 36 upon locking the said lid 38 to outer box 18. Springs 34 and 36 are attached to the front end of inner box 11 and spring 35 is attached to spring 36.

Clamp 42 is shown in Figures 5, 11 and 12. It is connected to the opposite end of chain 13 and is placed with its headed locking studs 44 44 into slots 58 58 on clamp spreaders 59 59. When the driver pulls lever 1 backwards, inner box 11 is projected outward through door 25 of outer box 18 adjacent to rear wheel 37, this same movement opening door 25 by stud 26 projecting from inner box 11 operating in the U-shaped lever 28 pivoted to outer box 18 at 29 and transmitting the movement through connecting rods 30 and 31 to door 25.

The clamp 42 being placed with locking studs 44 44 in slots 58 58 of clamp spreaders 59 59 and the spreaders pivoting on clamp 42 at 60 60, is expanded by the rearward movement of box 11 forcing the shaped clamp spreaders 59 59 along between rollers 67 67,—attached by clips 68 68 to lid 38 of outer box 18. Clips 68 68, projecting slightly over rollers 67 67, serve as guides to clamp spreaders 59 59 and, the rearward movement of box 11 continuing, clamp spreaders 59 59 pass beyond rollers 67 67 and release clamp 42 with chain 13 attached unto tire 69.

The automobile is now put into reverse action which lifts lock studs 44 44 of clamp 42 out of slots 58 58 of clamp spreaders 59 59 whilst the latter are forced outward and away from tire 69 through the action of springs 66 66 operating on studs 64 64 on toggle arms 61 61. These studs 64 64 protrude through slots 65 65 in angle irons 77 77,—springs 66 66 being attached to the inner sides of box 11. Slots 65 65 limit the traverse of toggle arms 61 61. These toggle arms 61 61 also give the required clearance between clamp spreaders 59 59 and the top of inner box 11 so that clips 68 68 can serve as guides to clamp spreaders 59 59 and prevent them from slipping from rollers 67 67.

The forward ends of spreader arms 59 59 are sharply turned inwards to insure their return in proper relation to rollers 67 67, their extremities being slightly turned downward so as to insure the parallel movement of clamp spreaders 59 59 in relation to inner box 11,—the turned down sections 70 70 using the end wall of box 11 as runner. Small projections 71 71 at the front ends of 70 70 keep spreader arms 59 59 in place.

As lever 1 moves into its final position and is locked to quadrant 2 at 3, clamp spreaders 59 59 are forced yet further apart and away from tire 69. This is secured by contact of bent portion 73 73 of clamp spreaders 59 59 with blocks 72 72 in outer box 18. In this manner ample clearance for clamp 42 and chain 13 is provided after the latter has been locked to tire 69.

The rearward movement of inner box 11 is temporarily interrupted, when notch 22 on brace 23 catches on stud 74 of outer box 18. Engagement between notch 22 and stud 74 is insured by the downward action of spring 75, brace 23 being pivoted to adjusting arm 24 forces adjusting arms 24 24,—rigidly connected with each other downward following the rearward movement of lever 1. This downward movement is arrested when the upper ends of adjusting arms 24 24 strike angle irons 77 77. With lever 1 locked to quadrant 2 at 3, adjusting arms 24 24 are held firmly in a downward position as shown in Figure 8 in broken lines.

Catches 46 46 of automatic locks 45 45 are held firmly in sockets 53 53 by jogs 80 80 of catches 46 46 resting on projections 86 86,—the ends of catches 46 46 fitting snugly into the inner recess of sockets 53 53 and the upturned ends of springs 55 55 engaging with notches 56 56 on catches 46

46. Springs 55 55 are attached to the lower sides of adjusting arms 24 24.

The automatic locks 45 45, thus held, must be drawn slightly rearward before they can be released from sockets 53 53 and this fact prevents any untimely release or the possibility of their being pulled out of sockets 53 53 until slightly more than one revolution of wheel 37 has been accomplished.

When wheel 37 has almost completed one revolution in reverse, locking studs 44 44 are in position to engage with catches 46 46 as shown in Figure 14. Continuing the reverse motion of wheel 37, adjusting arms 24 24 with locks 45 45 are pulled upwards against pressure from spring 12 in universal joint 5. Meanwhile catches 46 46 move towards and engage with the lower side of studs 44 44 in tire clamp 42. The upward movement of adjusting arms 24 24 is arrested when they strike the rear ends of angle irons 77 77. This upward movement releases notch 22 in brace 23 from stud 74 and inner box 11 with the attached adjusting arms 24 24 projects still further rearward and upon continued reverse movement of rear wheel 37 catches 46 46 are drawn from sockets 53 53 whilst spring 12 in universal joint 5 insures the forcing of catches 46 46 through locking arms 47 47 and safety studs 49 49 dropping back under pressure from springs 48 48 prevent any reverse action. Lever 1 locked to quadrant 2 at 3 definitely limits the extent to which box 11 can be projected to the rear after brace 23 has been released from stud 74.

The necessary tension for tightening chain 13 just prior to locking on tire 69 is supplied by spring 12 in universal joint 5 and is regulated by adjustment of locknuts 81 81 on bolt 82 shown in Figure 2.

Chain 13, having been tightly locked to wheel 37, lever 1 is pushed forward and this forces inner box 11 back into outer box 18 whilst stud 26, operating upon U-shaped lever 28 closes door 25. Locking lever 1 on quadrant 2 at 85 insures that door 25 remains closed and the cycle of operations is completed.

I claim:—

1. In combination with a vehicle and folded tire chains contained in movable inner boxes arranged adjacent to the drive wheels,—means for projecting, tightening and locking the said chains to the said drive wheels comprising:—a hand lever conveniently arranged to the driver's seat acting through adjustable connecting rods upon universal joints in which means are provided for taking up any irregular or reverse movement of the chain projecting device for securing the definite operating of the chain locks and for supplying the necessary tension to the chain prior to the closing of the chain locks, means for transmitting a longitudinal movement from the said universal joint to the chain carrying inner box,— means attached to the said inner box for spreading the elastic tire clamps,—means for holding and regulating the movement of the automatic locks,—means for insuring clearance for necessary parts to operate between the inner and outer boxes,—means for actuating the opening and closing device of the outer box,—means for holding, the timely expanding and the ultimate releasing of the tire clamps unto the tire,—studs in the said tire clamps serving the dual purpose of holding the clamps in the clamp spreaders and subsequently securing the automatic chain locks, —eyes in the said tire clamps holding one end of the tire chain system,—means attached to the other end of the tire chain system comprising a locking device engaging with and securely fastening on to said clamp studs.

2. In combination with a vehicle and folded tire chains, a lever conveniently placed to the driver's seat, adjustable connecting rods attached thereto, transmitting the movement to a universal joint comprising a bolt with calotte shaped head, coaxially arranged within a fork and passing in turn through a slot in a power transmitting member, a bell shaped washer so cut as to be held within and slide a limited distance along said fork, a spiral spring encircling said bolt, a centralized hole in the bend of the fork,— pressure of the spring being regulated by locknuts on the threaded end of the bolt projecting through the bent end of the fork.

3. In combination with a vehicle and folded tire chains, a hand lever conveniently arranged to the driver's seat, connecting rods, universal joints, levers acting from said universal joints and transmitting a longitudinal movement through the bottom of a fixed outer box to a movable inner box,—one placed within the other in close proximity to the driving wheel, said inner box serving as a receptacle for the folded tire chain and carrying means for holding and contributory to or essential for expanding the tire clamps and means for holding chain locks and for placing said tire clamps and chain locks into such position relative to the tire as to ensure the development and the automatic tightening and fastening of said chain upon said tire,—means for actuating the opening and closing mechanism of the end door of the outer box,—means for securing the orderly development of the chain upon the tire,—means for insuring clearance for the operating parts between the said inner and outer boxes and means for assisting in securing clearance between the clamp spreaders and the chain when attached to the tire.

4. In combination with a vehicle and folded tire chains a lever conveniently placed to the driver's seat, connecting rods transmitting the movement of the said hand lever through a universal joint to a movable inner box contained within a fixed outer box,—the provision of a set of tire clamp spreaders pivotally and indirectly fixed to the inner box and pivotally arranged against the tire clamp,—shaped throughout their length to provide for the timely opening and releasing of the said clamps when coming under the influence of rollers attached to the lid of the outer box.

5. In combination with a vehicle and folded tire chains, a lever conveniently placed to the driver's seat, connecting rods transmitting the movement of the said lever through a universal joint to a movable inner box contained within a fixed outer box, the said inner box carrying a system of tire clamp spreaders, the lid of the outer box carrying clips and rollers guiding and actuating the said clamp spreaders,—the arrangement of pairs of adjusting arms rigidly connected with each other and each pair pivotally connected with each movable inner box and provided with means for limiting the scope of their traverse and provided with sockets and springs for the retention of the locking device and with a notched brace pivoted thereto which engages with a stud in the outer box.

6. In combination with a vehicle and folded tire chains, a lever conveniently placed to the driver's seat, adjustable connecting rods transmitting the movement of the said hand lever through a universal joint to a movable inner box contained within a fixed outer box, a system of tire clamp spreaders and adjusting arms carried by the said inner box, clips and rollers attached to the lid of the outer box and guiding and actuating said tire clamp spreaders, the provision of an elastic tire clamp so shaped as to firmly hold on to the tire of the wheel of the said vehicle when released thereunto, with means for securing same to one end of a tire chain system and provided with locking studs,—the said locking studs serving at the same time as points of attack for the clamp spreaders.

7. In combination with a vehicle and folded tire chains, a lever conveniently placed to the driver's seat, adjustable connecting rods, universal joints, outer boxes containing movable inner boxes, systems of tire clamp spreaders and adjusting arms pivotally attached to the said inner boxes, clips and rollers guiding and actuating the said tire clamp spreaders and attached to the lids of the outer boxes, braces pivotally secured to said adjusting arms, elastic tire clamps with locking studs and tire chain systems attached to said tire clamps,—the arrangement of automatic chain locks consisting of a catch and, pivotally connected therewith, a locking lever to which the other end of the chain system is attached and provided with means for preventing the untimely or accidental opening of said chain locks and further provided with a notch so placed as to engage with a holding spring in the socket of the adjusting arm.

8. In combination with a vehicle and folded tire chains, a lever conveniently placed to the driver's seat, adjustable connecting rods transmitting the movement of the said hand lever through a universal joint to a movable inner box contained within a fixed outer box,—the arrangement of a U-shaped lever on the inner side wall of the said outer box connecting with an end door by means of opening rods and actuated by a stud fixed to the movable inner box.

LESLIE INNACE LEGG.